(12) United States Patent
Stiernagle (10) Patent No.: US 9,430,788 B2
(45) Date of Patent: Aug. 30, 2016

(54) RETAIL LOCATION ROBOTIC WALL SYSTEM

(71) Applicant: BBY SOLUTIONS, INC., Richfield, MN (US)

(72) Inventor: Chad Stiernagle, Eagan, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 14/973,239

(22) Filed: Dec. 17, 2015

(65) Prior Publication Data

US 2016/0104220 A1    Apr. 14, 2016

Related U.S. Application Data

(63) Continuation of application No. 13/472,532, filed on May 16, 2012, now Pat. No. 9,230,387.

(60) Provisional application No. 61/489,918, filed on May 25, 2011.

(51) Int. Cl.
| | |
|---|---|
| *G06F 7/00* | (2006.01) |
| *G06Q 30/06* | (2012.01) |
| *G07F 9/02* | (2006.01) |
| *G07F 11/16* | (2006.01) |
| *B25J 11/00* | (2006.01) |
| *G06Q 10/08* | (2012.01) |
| *G06Q 20/18* | (2012.01) |

(52) U.S. Cl.
CPC .......... *G06Q 30/0601* (2013.01); *B25J 11/008* (2013.01); *G06Q 10/087* (2013.01); *G06Q 20/18* (2013.01); *G07F 9/023* (2013.01); *G07F 11/165* (2013.01); *Y10S 901/02* (2013.01)

(58) Field of Classification Search
None
See application file for complete search history.

(56) References Cited

U.S. PATENT DOCUMENTS

| | | | |
|---|---|---|---|
| 4,270,319 A | 6/1981 | Spasojevic | |
| 4,567,359 A | 1/1986 | Lockwood | |
| 4,591,070 A | 5/1986 | Wirstlin | |
| 5,206,814 A | 4/1993 | Cahlander et al. | |
| 5,362,197 A | 11/1994 | Rigling | |

(Continued)

FOREIGN PATENT DOCUMENTS

| | | |
|---|---|---|
| CA | 1252430 A | 4/1989 |
| DE | 3941754 A1 | 6/1991 |

(Continued)

OTHER PUBLICATIONS

"B. Small Goods Storage, B6. Miniload single store", ® Copyright 2008, (2008), 3 pgs.

(Continued)

*Primary Examiner* — Yolanda Cumbess
(74) *Attorney, Agent, or Firm* — Schwegman Lundberg & Woessner, P.A.

(57) ABSTRACT

A robotic retail wall is presented allowing for the dispensing of merchandise within a retail location. The robotic wall includes commodity products and robotics that pick and deliver products to consumers in response to input at a kiosk. The robotics and products are separated from a retail space by a transparent barrier, allowing consumers in the retail space to view the actions of the robotics in retrieving a product. Behind the robotic wall is a product stocking area, where commodity products can be added to the robotic wall with assistance from the robotics.

21 Claims, 5 Drawing Sheets

(56) References Cited

U.S. PATENT DOCUMENTS

| | | |
|---|---|---|
| 5,544,996 A | 8/1996 | Castaldi et al. |
| 5,595,263 A | 1/1997 | Pignataro |
| 5,720,547 A | 2/1998 | Baird |
| 5,838,566 A | 11/1998 | Conboy et al. |
| 5,927,544 A | 7/1999 | Kanoh et al. |
| 6,059,092 A | 5/2000 | Jerue et al. |
| 6,064,921 A | 5/2000 | Pippin et al. |
| 6,210,093 B1 | 4/2001 | Hannen et al. |
| 6,360,904 B1 | 3/2002 | Schilb et al. |
| 6,393,339 B1 | 5/2002 | Yeadon |
| 6,424,111 B1 | 7/2002 | Romig |
| 6,490,502 B2 | 12/2002 | Fellows |
| 6,535,790 B2 | 3/2003 | Nakano et al. |
| 6,547,096 B1 | 4/2003 | Chirnomas |
| 6,584,375 B2 | 6/2003 | Bancroft et al. |
| 6,609,047 B1 | 8/2003 | Lipps |
| 6,688,451 B2 | 2/2004 | Derby et al. |
| 6,694,217 B2 | 2/2004 | Bloom |
| 6,842,665 B2 | 1/2005 | Karlen |
| 6,962,267 B2 | 11/2005 | Herzog et al. |
| 7,039,495 B1 | 5/2006 | Conboy et al. |
| 7,203,570 B2 | 4/2007 | Karlen |
| 7,261,511 B2 | 8/2007 | Felder et al. |
| 7,364,050 B2 | 4/2008 | Guard |
| 7,381,022 B1 | 6/2008 | King |
| 7,444,204 B2 | 10/2008 | Chirnomas |
| 7,536,283 B2 | 5/2009 | Potter et al. |
| 7,621,108 B1 | 11/2009 | Brastauskas et al. |
| 7,780,392 B2 | 8/2010 | Rogers et al. |
| 7,787,681 B2 | 8/2010 | Zhang et al. |
| 7,809,470 B2 | 10/2010 | Shoenfeld |
| 7,896,243 B2 | 3/2011 | Herskovitz |
| 7,988,015 B2 | 8/2011 | Mason, II et al. |
| 8,078,316 B2 | 12/2011 | Blust et al. |
| 8,092,140 B2 | 1/2012 | Baker et al. |
| 8,140,187 B2 | 3/2012 | Campbell et al. |
| 8,162,174 B2 | 4/2012 | Hieb et al. |
| 8,175,925 B1* | 5/2012 | Rouaix ............... G06Q 20/203 705/22 |
| 8,204,624 B2 | 6/2012 | Zini et al. |
| 8,239,062 B2 | 8/2012 | Vahlberg et al. |
| 8,281,553 B2 | 10/2012 | Kim |
| 8,308,414 B2 | 11/2012 | Schifman et al. |
| 8,403,614 B2 | 3/2013 | Bastian, II et al. |
| 8,417,380 B2 | 4/2013 | Kuehnrich et al. |
| 8,494,672 B2 | 7/2013 | Chirnomas |
| 8,494,673 B2 | 7/2013 | Miranda et al. |
| 8,571,700 B2 | 10/2013 | Keller et al. |
| 8,571,701 B2 | 10/2013 | Lunak et al. |
| 8,571,708 B2 | 10/2013 | Rob et al. |
| 8,620,472 B2 | 12/2013 | Mockus et al. |
| 8,632,294 B2 | 1/2014 | Subotincic |
| 8,678,232 B2 | 3/2014 | Mockus et al. |
| 8,695,814 B2 | 4/2014 | Van Ooyen et al. |
| 8,705,388 B2 | 4/2014 | Gong et al. |
| 8,706,293 B2 | 4/2014 | Lu |
| 8,712,586 B2 | 4/2014 | Allinson |
| 8,738,177 B2 | 5/2014 | Van Ooyen et al. |
| 8,768,789 B2 | 7/2014 | Smith et al. |
| 9,230,387 B2 | 1/2016 | Stiemagle |
| 2004/0059463 A1 | 3/2004 | Coughlin |
| 2004/0071539 A1 | 4/2004 | Anater, Jr. et al. |
| 2004/0191032 A1 | 9/2004 | Foulke et al. |
| 2005/0055361 A1 | 3/2005 | Deal |
| 2005/0063801 A1 | 3/2005 | Durand et al. |
| 2005/0216120 A1 | 9/2005 | Rosenberg et al. |
| 2005/0238465 A1 | 10/2005 | Razumov |
| 2006/0045674 A1 | 3/2006 | Craven |
| 2007/0071585 A1 | 3/2007 | Henkel |
| 2008/0008568 A1 | 1/2008 | Harris et al. |
| 2008/0122615 A1 | 5/2008 | Shoenfeld |
| 2008/0284139 A1 | 11/2008 | Shockley |
| 2009/0005905 A1 | 1/2009 | Kuehnrich et al. |
| 2009/0164328 A1 | 6/2009 | Bishop et al. |
| 2009/0312864 A1 | 12/2009 | Hanel |
| 2010/0017296 A1 | 1/2010 | Spignesi, Jr. et al. |
| 2010/0121481 A1 | 5/2010 | Talley et al. |
| 2010/0138037 A1 | 6/2010 | Adelberg et al. |
| 2010/0234990 A1 | 9/2010 | Zini et al. |
| 2011/0071928 A1 | 3/2011 | Young |
| 2011/0172815 A1 | 7/2011 | Kim |
| 2011/0229296 A1 | 9/2011 | van Ooyen et al. |
| 2012/0029685 A1 | 2/2012 | Keller et al. |
| 2012/0029687 A1 | 2/2012 | Hagen et al. |
| 2012/0033209 A1 | 2/2012 | Osterkamp et al. |
| 2012/0101627 A1 | 4/2012 | Lert |
| 2012/0104785 A1 | 5/2012 | Hixson et al. |
| 2012/0136477 A1 | 5/2012 | Morrow et al. |
| 2012/0219397 A1 | 8/2012 | Baker |
| 2012/0298688 A1 | 11/2012 | Stiernagle |
| 2012/0303154 A1 | 11/2012 | Stiernagle |
| 2013/0123978 A1 | 5/2013 | Stark et al. |
| 2013/0253700 A1 | 9/2013 | Carson et al. |
| 2013/0297066 A1 | 11/2013 | Alvern |
| 2014/0052498 A1 | 2/2014 | Marshall et al. |
| 2014/0100769 A1* | 4/2014 | Wurman ............... G06Q 10/087 701/301 |
| 2014/0212250 A1 | 7/2014 | Wolter |

FOREIGN PATENT DOCUMENTS

| | | |
|---|---|---|
| EP | 0169156 A1 | 1/1986 |
| JP | 61-150908 A | 7/1986 |
| JP | 61150908 A | 7/1986 |
| WO | WO-2009065145 A1 | 5/2009 |
| WO | WO-2012019189 A2 | 2/2012 |

OTHER PUBLICATIONS

"B. Small Goods Storage, B6. Miniload multi-store", ® Copyright 2008, (2008), 3 pgs.

"U.S. Appl. No. 13/472,532, Non Final Office Action mailed Apr. 14, 2015", 7 pgs.

"U.S. Appl. No. 13/472,532, Notice of Allowance mailed Nov. 12, 2015", 6 pgs.

"U.S. Appl. No. 13/472,532, Notice of Non-Compliant Amendment mailed Feb. 24, 2015", 2 pgs.

"U.S. Appl. No. 13/472,532, Response filed Feb. 3, 2015 to Restriction Requirement mailed Dec. 3, 2014", 6 pgs.

"U.S. Appl. No. 13/472,532, Response filed Mar. 23, 2015 to Notice of Non-Compliant Amendment mailed Feb. 24, 2015", 6 pgs.

"U.S. Appl. No. 13/472,532, Response filed Oct. 15, 2015 to Non Final Office Action mailed Apr. 17, 2015", 8 pgs.

"U.S. Appl. No. 13/472,532, Restriction Requirement mailed Dec. 3, 2014", 5 pgs.

"U.S. Appl. No. 13/562,744, Restriction Requirement mailed Oct. 6, 2015", 7 pgs.

"Automatic Retail Selling Device and Method of Operation Therefore", Wikipedia, (May 22, 2009).

"Clerk? What's a clerk?", Lancaster Newspapers. Inc, (Oct. 31, 2002).

"Everything-Robotic", The Robot Report, (Oct. 2, 2012).

"Kroger debuts kiosk concept at area college campus", The Blade, (Feb. 15, 2012).

"Robotic Grocery Stores Pop Up Nationwide", Enterprise Efficiency, (Apr. 5, 2012).

"The End of Separation: Man and Robot as Collaborative Coworkers on the Factory Floor", Shelf Plus, (Aug. 8, 2013).

Murray, Charles J, "Now There's a Robot", Design News, (Mar. 26, 1990), 78.

* cited by examiner

RETAIL LOCATION ROBOTIC WALL SYSTEM

RELATED APPLICATION

The present application is a continuation of U.S. patent application Ser. No. 13/472,532, filed May 16, 2012, which claims the benefit of U.S. Provisional Application Ser. No. 61/489,918, filed May 25, 2011, which applications are hereby incorporated by reference.

FIELD OF THE INVENTION

The present application relates to the field of physical retail sales locations. More particularly, the described embodiments relate to a robotic wall implemented in a retail store location to dispense and sell commodity products.

DETAILED DESCRIPTION

Figure 1:
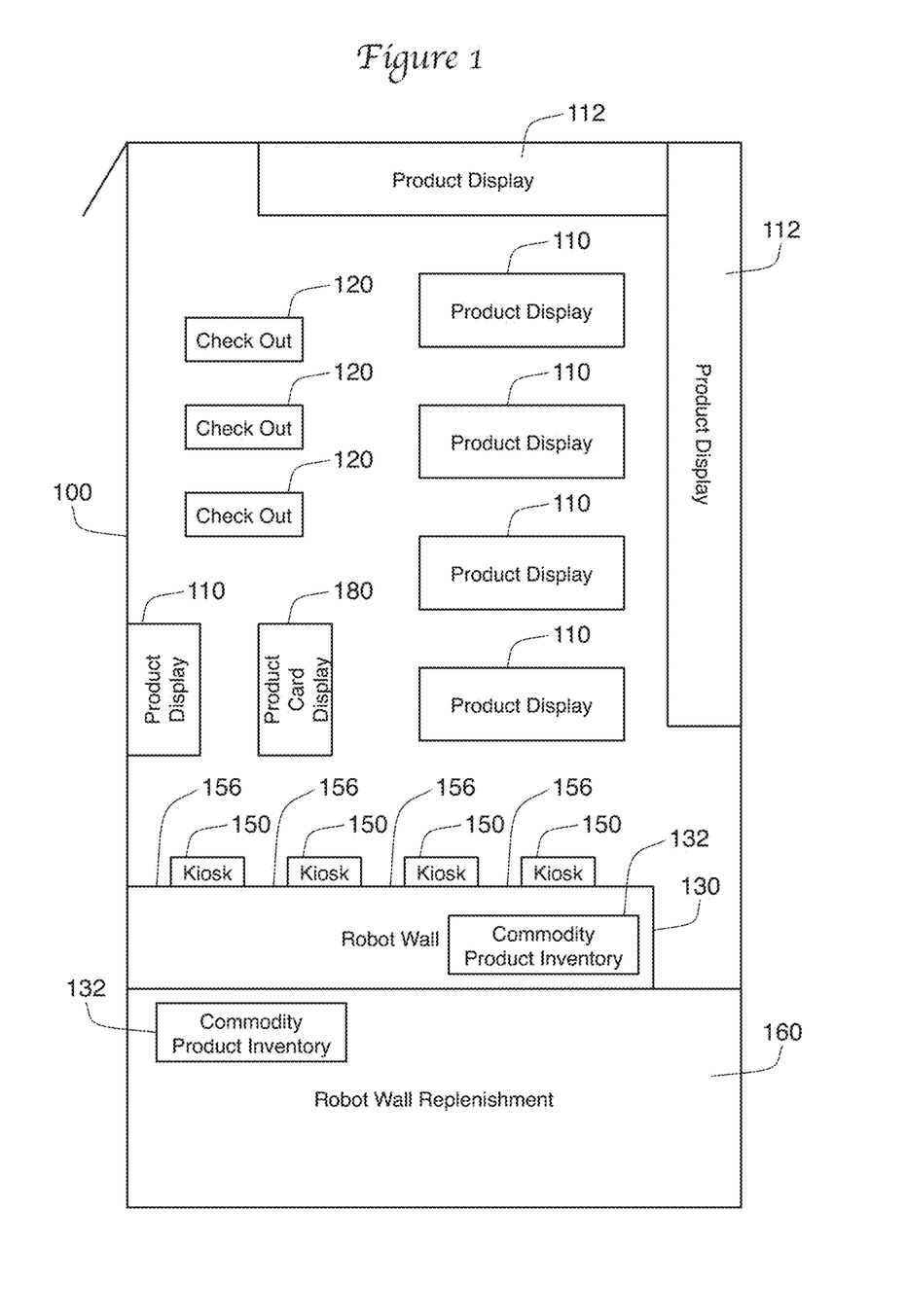
FIG. 1 is a schematic diagram of a retail sales location utilizing one embodiment of a robotic wall.

FIG. 1 shows a retail location 100 such as an electronics store. The retail location 100 includes a variety of product displays 110 and 112 in which products are displayed to customers. Product displays 110 are free-standing units, while product displays 112 are designed to be located against a wall of the retail location 100. Customers that are interested in a product can remove the product from the displays 110 or 112 and bring the product to a checkout location 120 for purchase. In order to allow customers to help themselves to merchandise, the product displays 110-112 generally keep all products within easy reach of the customer. Thus, even though a retail location may have a wall height of 15-20 feet or higher, product displays 110-112 generally do not place products higher than six or seven feet.

Like most retailers, electronic retailers sell commodity, low-margin products as well as higher-margin products. For instance, CDs, DVDs, Blu-ray disks, and video games are low-margin, commodity-type products for an electronics store, while televisions and appliances that may be sold with service plans are higher-margin products. It can be difficult to properly allocate limited product display locations 110-112 between these two different types of goods. While it is tempting to reduce the display locations 110-112 allocated to commodity-type products, customers frequently visit a retail location 100 in order to purchase the commodity product. Thus the retail location 100 must make the purchase experience for commodity products at least as inviting as for the higher margin products. An electronics store that reduces product display space for music, movies, and games in order to display more televisions and appliances risks reducing customer visits to the store location 100. Furthermore, if the commodity products are displayed in a less desirable location in the store, or in a more compact and crowded environment, the customer may also choose to shop for such goods elsewhere.

In the retail location 100 shown in FIG. 1, commodity product inventory 132 such as movies, games, and music are stored and dispensed from a robotic wall 130. While a portion of commodity product inventory 132 is displayed in robotic wall 130, a portion may also be hidden from view in robot wall replenishment area 160. Kiosks 150 are located along robot wall 130 to allow customers to select products from inventory 132. In response to a customer selection, the robot wall 130 retrieves the desired product from inventory 132 and dispenses it to the customer at product delivery area 156.

Figure 2:
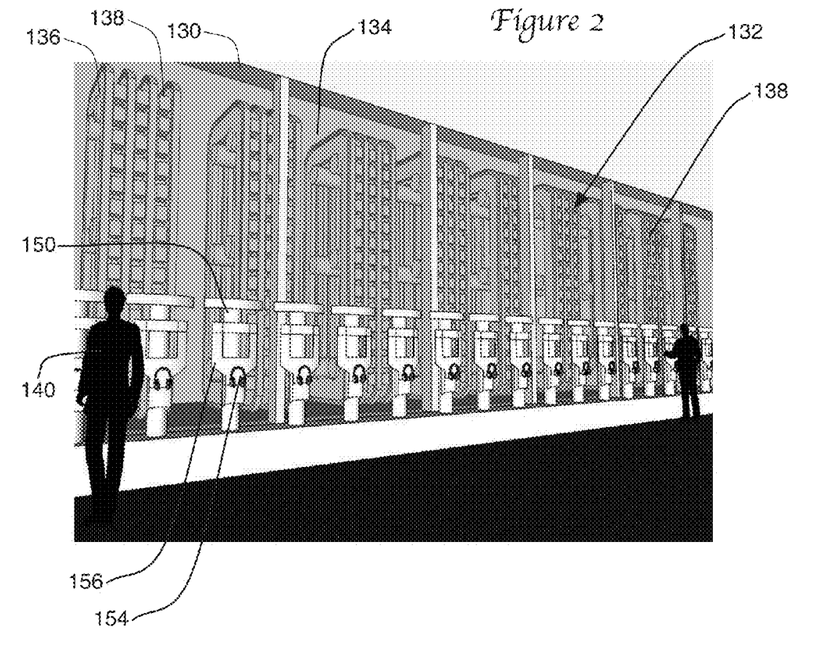
FIG. 2 is a perspective drawing of one embodiment of a robotic wall using kiosks.

An example of a robotic wall 130 is shown in FIG. 2. Commodity products are located behind a transparent wall 134 in the robotic wall 130. Robotics 136 select particular products 138 as desired by a customer 140 who interacts with the robotic wall 130 through a plurality of kiosks 150. Robotic wall 130 takes advantage of the otherwise underutilized vertical aspect of the retail location 100. Inventory 132 can be densely packed within the robotic wall 130, allowing the robot wall 130 to hold more products 138 per square foot of floor space. Because the entire height of a wall can be used to store inventory 132, the retail location 100 can carry a much greater selection of commodity products 138 than would otherwise be possible. Furthermore, because the products 138 are densely packed and stored vertically up the wall, the retail location 100 is able to free valuable floor space for high-margin products or for otherwise improving the retail shopping experience. It is estimated that in a traditional retail location, it would be possible to redeploy seventy percent of the space in a retail location 100 currently allocated to commodity products by use of the robotic wall 130. It would even be possible to shrink the retail location size 100 while still carrying the same inventory of products. In the preferred embodiment, the robotic wall 130 is greater than ten feet tall, perhaps reaching fifteen or twenty feet tall. Since the robotic wall 130 can extend along a wall, the preferred embodiment may be twenty feet long or longer.

Figure 3:
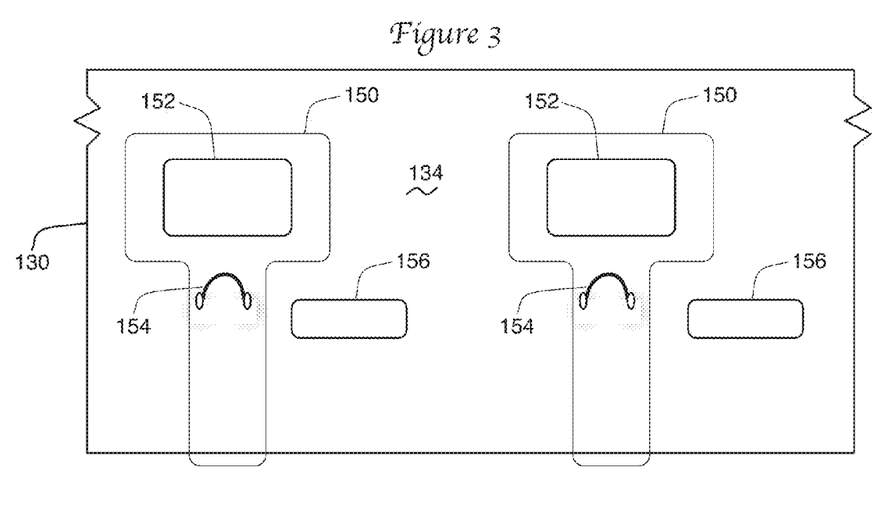
FIG. 3 is a view of a kiosk according to one embodiment.

FIG. 3 shows an embodiment of kiosks 150. The kiosks 150 are spaced evenly along the length of the robotic wall 130. In the preferred embodiment, multiple kiosks 150 are present, allowing many customers 140 to use robot wall 130 simultaneously. In FIG. 3, only two kiosks 150 are shown, but the preferred embodiment includes at least five and perhaps dozens of kiosks 150 for a single robotic wall, such as shown in FIG. 2. Each kiosk 150 may contain a visual display 152 and a headset 154. The kiosk 150 will also include a user input device, such as a touch screen 152 that allows the user to enter queries and make selections on the kiosk 150. Although it is not shown in FIG. 3, it is within the scope of the present invention to include keyboards, mice, and other input devices to facilitate user interaction with the kiosks 150. In the preferred embodiment, a product delivery area 156 is located in or near each kiosk 150. The product delivery area 156 may be a hole in the transparent barrier 134 that divides the main retail space of the retail location 100 from the interior of the robotic wall 130. The product delivery area 156 may include a conveyor or trap doors to move the select product from the reach of the robotics 136 to the reach of the consumers 140. Care should be taken when constructing the product delivery area 156 to prevent a consumer 140 from reaching into the interior of the robotic wall 130 both to prevent theft of products 138 and to prevent injury to the consumer 140.

Figure 4:
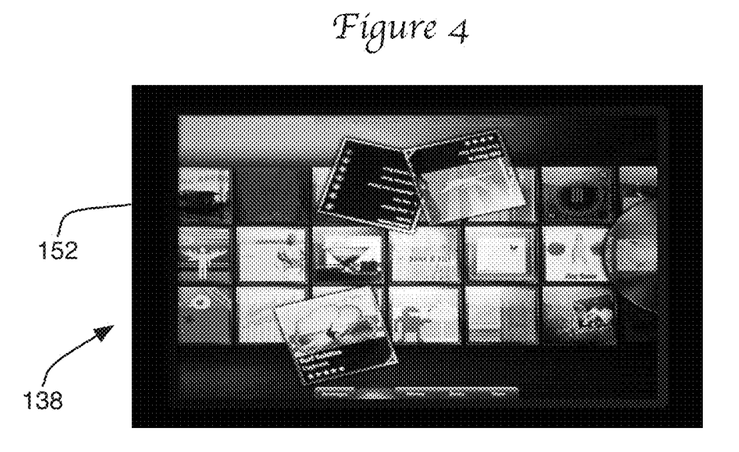
FIG. 4 is a visual display for browsing commodity products.

The kiosks 150 can be designed to allow the consumer 140 to browse the products 138 available in the commodity product inventory 132. FIG. 4 shows an example of a visual display 152 designed to make browsing for commodity products 138 interesting. Headsets 154 and displays 152 allow customers 140 to fully preview movie, music, and even gaming products at the kiosks 150. Preferably, the kiosks 150 have connectivity to the Internet, allowing the customer 140 to learn more information about the products 138 and to compare one product to another. In one embodiment, this connectivity is limited to a particular website, such as a website run by the retailer that provides the retail location 100. In other embodiments, connectivity is allowed to major media review sites, or even full Internet access. In addition, the visual display 152 of a kiosk 150 may allow the consumer 140 to express requests for products 138 that are not currently in inventory 132. The request can be a simple request that the product 138 be stocked in the robotic wall 130 at this location, or the request can include a request to purchase the products 138 and have the purchased products shipped to the retail location 100 or directly to the consumer 140.

Because wall 134 is transparent, customer 140 can see the robotics spring into action. By allowing robotics 136 to pick the products 138 and place the products in front of the consumer 140 at the kiosk 150, the robotic wall 130 creates a visually exciting retail experience. Consumers approach the robotic wall 130 to see the products 138 and the robotics 136. This visual robotic motion will attract attention from shoppers in the retail location 100, thereby increasing shopper excitement.

In one embodiment the kiosks 150 can be designed to receive payment, such as through credit or debit cards, gift cards, or cash. In this embodiment, a product 138 is not dispensed from the robotic wall 130 until payment has been received for the product 138. Alternatively, the robotic wall 130 can be used merely to dispense products, with the actual purchase taking place at traditional checkout locations 120 in the retail location 100. Regardless of whether payment is required before a product 138 is dispensed, the use of a robotic wall 130 should reduce theft, or "shrink," of commodity products, as the products themselves will not be accessible to customers who are only browsing through the inventory.

Restocking of the commodity product inventory 132 in the robotic wall 130 takes place behind the robotic wall 130. In FIG. 1, the restocking takes place in the robotic wall replenishment area 160. This can be a room behind the robotic wall 130 that can be used both for replenishment and for storage. In the preferred embodiment, replenishment area 160 is hidden from view and cannot be seen through the robot wall 130. Ideally, the robotics 136 in the robotic wall. 130 will be used to help replenish the inventory retained in the wall 130. When a product 138 is added to the robotic wall 130, the robotics 136 can scan and identify the product, and record its location for later retrieval when identified by a consumer.

Figure 5:
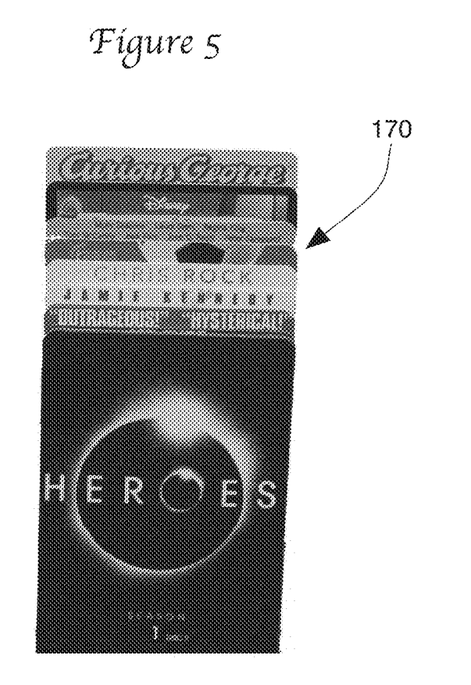
FIG. 5 is a plan view of a plurality of product cards.

In another embodiment, product cards, such as cards 170 shown in FIG. 5, can be used by customers 140 to select products 138 stored in the robot wall 130. Product cards 170 contain pictures and descriptions for the commodity products 138. Products 138 generally provide information on their packaging related to the contents of the product 138. Product cards 170 may contain information similar or identical to the information available on the packaging of products 138. This allows customers to have close to the same shopping experience that they had before the use of the robotic wall 130, as product cards 170 can be sorted and provided to the customer much like the products 138 themselves. The product cards 170 can contain a bar code or other identifier that can be read by the kiosk to identify the product 138 to the robotics 136. This embodiment allows customers to bypass the step of searching for products 138 at the visual display 152 of kiosk 150.

As shown in FIG. 1, it is possible to locate a product card display area 180 near the robotic wall 130. Because the cards are much slimmer than the actual products 138, the amount of the retail location 100 dedicated to displaying commodity products 138 is still greatly reduced (by as much as a factor of 22). Thus a retail location 100 can still allow physical browsing and present a much larger inventory 132 for the customer 140 while reducing the floor space dedicated to commodity products and shrink associated with product theft. Of course, it would be possible to still have certain products 138 on display in the retail location 100, allowing grab-and-go shopping for customers for the latest releases of music, movies, or games.

FIG. 5 shows a system 600 in which numerous retail locations 610 have implemented normal product display apparatuses (such as shelves, end caps, and island displays) 620 along with a robotic wall 630. In most retailers, the product mix that is displayed on the display apparatuses 620 are governed by a planogram. A planogram is a plan that determines the amount and location of product that will be displayed in the store, the layout and mix of the physical product display apparatuses 620, as well as the location of the products on each of the product displays 620. Most retailers design their retail locations 610 to be similar, such that numerous retail locations 610 will have similar or identical product display configurations. These similar locations 610 are then usually governed by a single planogram, such that a first retail location 610 will have the same product mix displayed in on the same product displays 620 as the next location 610. While some minor variations may be permitted between retail locations, large retailers prefer to have multiple locations 610 to use the same planogram. Other retailers have a variety of store formats (e.g., small, medium, and large retail locations). Each of these formats would have a separate planogram, but individual stores within the format are expected to use the same planogram. One obvious disadvantage of using a universal planogram over a variety of retail locations is that it is difficult or impossible to change the products being displayed and sold from one location to the next. To allow some variations, some retailers allocate a portion of the store to regional preferences. Frequently, the remainder of the store uses a universal planogram, and even the regional portion will likely be subject to a pre-defined planogram for that region.

To replenish products that are sold at a location 610, products are delivered to and received at the store's replenishment delivery area 640. This area may include truck loading docks, back room storage, and inventory locations. To restock the store shelves, employees of the location receive products from the delivery area 640, and then consult the planogram for the product displays 620. The planogram will set forth the exact location of each product to be stocked on the product displays 620 of the retail locations. Unfortunately, while this process is common to all retail stores, the requirement that the displays 620 must be restocked according to the planogram for that display greatly increases the time required to restock inventory at the retail location.

One benefit of the robotic walls 130, 630 is that replenishment of the wall does not take place according to a planogram. Because users select products in the robotic wall 130 through the displays 152 of the kiosks 150, there is no need for the product inventory 132 of the wall 130 to be maintained in a uniform matter.

Figure 6:
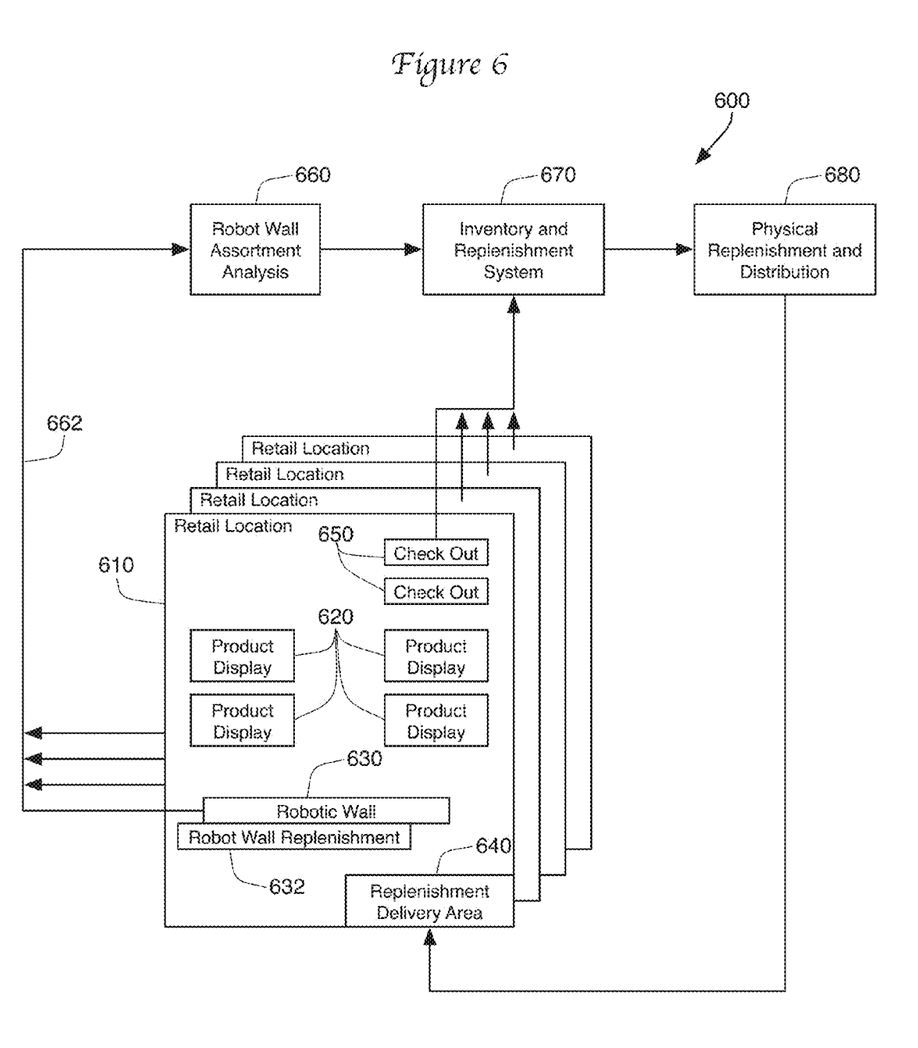
FIG. 6 is a schematic view of a replenishment system involving a plurality of retail locations using a robotic wall.

As shown in FIG. 6, products received at the retail location's replenishment delivery area 640 that are destined for the robotic wall 630 are added to the wall 630 through the replenishment system or area 632 behind (or beside) the wall 630. Since the products in the wall 630 are selected by users through kiosks and extracted and delivered through robotics, products can be added randomly to the wall inventory as long as the robotics track the location of each product added to the wall 630. Consequently, when products are added through the robot wall replenishment system 632, the robotics of the wall 630 receive the product, store the product in the inventory of the wall 630, and then track the location of that product within the inventory. When a user requests that product, the robotics will recall that location, and then select the product and deliver it to the user at the appropriate product delivery area.

When a product in the robotic wall 630 is delivered to a customer through a product delivery area in the wall 630, the robotic wall 630 notes that the product is no longer in its inventory. This information is shared with a remote computerized system 660 that analyzes the inventory and assortment of the products in the robotic wall 630. Communication with the remote system 660 takes place over a computerized network 662 such as the Internet. To facilitate this communication, both the robot wall assortment analysis computer system 660 and the robotic wall 630 contain network interfaces to communicate over this network. In the preferred embodiment, the network 662 is a TCP/IP network and the network interfaces include hardware and software components necessary to implement a TCP/IP protocol stack.

The remote system 660 comprises one or more server computers operating to receive data from a plurality of robotic walls 630 at a plurality of retail locations 610. These server computers 660 include a set of software instructions or interfaces stored on a non-volatile, non-transitory, computer readable medium such as a hard drive or flash memory device. A digital processor, such as a general purpose CPU manufactured by Intel Corporation (Mountain View, Calif.) or Advanced Micro Devices, Inc. (Sunnyvale, Calif.), accesses and performs the software. To improve efficiency, the processor may load software stored in memory into faster, but volatile RAM. The software operates on data, such as the inventory and delivery data received from the robotic walls 630. This data is stored in non-volatile memory and retrieved into RAM for analysis, recording, and reporting.

Data related to customer product delivery and product replenishment in the robotic walls 630 at the plurality of retail locations 610 is delivered to system 660 for analysis. In addition, the robotic walls 630 may allow customers to express requests for products that are not currently in inventory at the wall 630. These requests are also forwarded to system 660. The system 660 analyzes this data and determines an ideal product assortment for each individual robotic wall 630. If a first wall 630 sells more romantic comedy DVDs than the second wall 630, and the second wall 630 sells more "M" rated video games than the first wall 630, the system 660 will note the different desires of the customers at each wall 630 and change the assortment of products stored in inventory at the walls 630 to reflect these different desires.

This store-by-store differentiation of products in the walls 630 differs from the assortment of products presented to customers in the product displays 620, as the product displays 620 are all governed by a planogram that covers multiple retail locations 610. The products in the display 620 are purchased by customers at one or more check out (Point-of-Sale or POS) devices 650. These POS devices 650 read bar codes or other indicators off of the items purchased, total the purchases, accept payments, and print receipts for customers. The multiple POS devices 650 in a retail location 610 typically are networked together to a POS server (not shown) at the retail location 610, which then communicates sales data to a remote inventory and replenishment server system 670. This server system 670 is configured much like system 660, it that it consists of one or more computers with processors, non-volatile memory, RAM, network interfaces, software, and data. The inventory and replenishment system 670 accepts data from the POS devices 650 at a plurality of store locations 610 and uses this information to track inventory at the stores 610.

When the inventory for particular products is running low relative to the expect inventory in the governing planogram, the system 670 will request that additional product be sent to that store. Typically a system of distribution warehouses hold inventory that can be delivered to stores on an as-needed bases through a trucking distribution network. When products need to be delivered to a particular retail location 610, the inventory and replenishment system 670 will request that the physical replenishment and distribution system 680 will supply those products to that location 610. The physical replenishment and distribution system 680 may comprise its own server to receive network communications from the inventory replenishment system 670 and advise the warehouses and trucks on the delivery of the appropriate products to the retail locations 610. The distribution system server would also be configured like systems 670 and 660. In other embodiments, the functions of the distribution system server and the inventory and replenishment server 670 could be combined into a single server system that combines the functionality of both servers. When the physical replenishment and distribution system delivers products to the retail locations 610 through its distribution system (such as via trucks delivering goods from warehouses), the products are received at the replenishment delivery area 640 and distributed throughout the store location 610 as described above.

In one embodiment, the robot wall assortment analysis system 660 utilizes the existing product ordering and delivery system that is used by the retail locations 610 to maintain inventory in the product displays 620. In this embodiment, when the robot wall assortment analysis system 660 determines that additional products should be delivered to a robotic wall 630 at a retail location, it sends a request to the inventory and replenishment system 670 to add the necessary products to the next product delivery to that retail location 610. This communication can take place via computer-to-computer network messaging, such as a secure message passing over the Internet. The inventory and replenishment system 670 adds the additional products as requested to the next delivery, and the physical replenishment and distribution system 680 delivers these products destined to the robotic wall 630 to the replenishment deliver area 640 of that retail location 610.

In this way the robotic wall 630 for each location 610 can have a unique assortment of products based on the user interactions with the wall 630 at that location even though the product assortment on display on displays 620 remains governed by a multi-store planogram. At the same time, product replenishment for the wall 630 is controlled by a separate system 660, which itself integrates the actual product delivery to the location 610 with the main replenishment system that delivers products for physical product displays 620.

Figure 7:
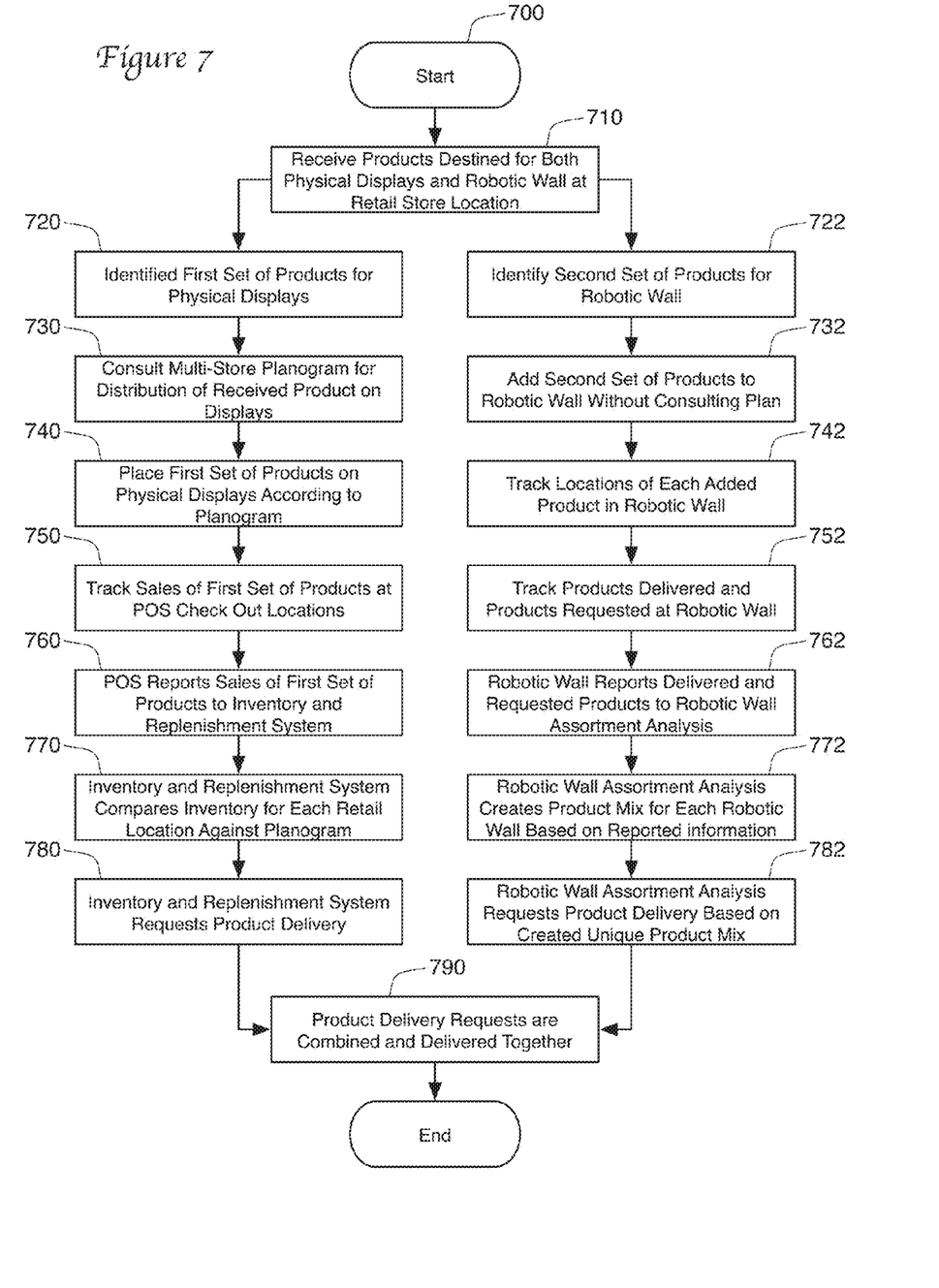
FIG. 7 is a flow chart showing a method for replenishing retail locations that use a robotic wall.

FIG. 7 shows a flow chart of a method 700 for replenishing retail locations that use a robotic wall. In step 710, products are received at a retail location 610. The products may be received at a replenishment delivery area 640 and include a first set of products destined for physical product displays 620 and a second set of products destined for a robotic wall 630. In step 720 the first set of products for physical displays are identified, and in step 722 the second set of products for the robotic wall are identified. The first and second set of products are each handled in a different but parallel manner. For the first set of products, a multi-store planogram is consulted in step 730 to determine where the first set of products should be distributed within the retail space 610. In step 740 the first set of products are displayed on physical product displays 620 according to the planogram. As the products on physical product displays 620 are sold, the product sales are tracked at step 750 at Point of Sale (POS) check out locations 650. Sales data from the POS are reported to an inventory replenishment system 670 in step 760. The sales data may be sent to the replenishment system 670 immediately as products are sold, or the POS may collect sales data and send the data to the replenishment system 670 at predetermined intervals, such as once per day.

Once sufficient sales data are collected from POS 650, the inventory and replenishment system 670 determines in step 770 which products in the first set of products for physical displays 620 need to be distributed to retail location 610. Replenishment system 670 accomplishes this task by comparing the actual inventory in the retail location 610 with the multi-store planogram. Because the planogram is standardized from store to store, the replenishment system merely compares the number of products in store inventory to the number of products required by the planogram. In step 780 the inventory and replenishment system 670 makes a request for product from the physical replenishment and distribution system 680.

In contrast to the method used for the first set of products, the products destined for the robotic wall 630 are identified in step 722, then added to the robotic wall 630 in step 732 without consulting a planogram. The robotic wall 630 is responsible for assigning locations to each product. Because the robotic wall 630 does not require a planogram, the costs associated restocking products and with designing and administering planograms for a retail location 610 are diminished. In step 742 the location of each product added to robotic wall 630 is tracked. The robot wall system 630 is designed so that, although the physical location of each product within robot wall 630 may be arbitrary, the products can be located by the tracking system of the wall 630 and retrieved immediately upon demand. Each product may be identified at several different points at the retail location 610. The products may be tracked when they enter the robot wall replenishment area 632, when they are transferred from area 632 to robotic wall 630, when they are delivered from the robotic wall 630 to a consumer, and when they are purchased at a POS 650. In step 752, the method tracks products that are delivered and products that are requested by consumers at the robotic wall 630. Step 752 allows the system to aggregate data regarding consumer demand for products. En particular, the number of units sold and units requested for a given product may be used to improve product selection for the robotic wall 630 at retail location 610.

In step 762 data regarding delivered products and requested products are collected from the robotic wall 630 and reported to the robot wall assortment analysis system 660. In step 772 the assortment analysis system 660 uses data from each individual retail location 610 to create a customized product selection mix for each location 610 based on actual past product sales and product requests for each location. The reported information is used to optimize product selection on a store-by-store basis. In step 782 the robotic wall assortment analysis system 660 sends a request for the unique product mix to the inventory and replenishment system 670.

After the first set of requested products for physical display and the second set of requested products for the robot wall are determined, at step 790 the product delivery requests are combined together and sent as a single request to the physical replenishment and distribution system 680. Step 790 simplifies the product replenishment process. The physical replenishment and distribution system 680 does not require separate orders, saving time and labor costs.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A robotic inventory dispensing system, comprising:
   an inventory storage area including a storage unit, the storage unit adapted to store respective product items for a plurality of products among a plurality of storage locations along a height and width of the inventory storage area;
   a product delivery area including a dispensing location, the dispensing location adapted to receive and dispense the respective product items for the plurality of products;
   a robotics unit operable to stock the respective product items within the storage unit, the robotics unit further operable to retrieve a requested product item from the storage unit and deliver the requested product item to the dispensing location, wherein the requested product item is associated with a identifier of a requested product of the plurality of products; and
   a robotic control system to control the robotics unit, the robotic control system including:
      a tracking system, wherein the tracking system is operable to track storage locations of the plurality of products, wherein the plurality of products are respectively associated with a plurality of product identifiers, and wherein the tracking system is further operable to track respective stocking locations of respective product items within the storage unit for the plurality of products based on the plurality of product identifiers; and
      a command system, wherein the command system is operable to receive the identifier of the requested product in response to selection of the requested product at a computing device, and wherein the command system is further operable to command the robotics unit to retrieve and deliver the requested product item from the storage unit to the dispensing location;

wherein the robotic control system operates to stock the storage unit independently of a planogram, wherein the plurality of products are automatically stocked by the robotics unit throughout the plurality of storage locations in the storage unit to mix stocking locations of different products associated with different product identifiers, and wherein the tracking system is further configured to track the mixed stocking locations of the different products associated with the different product identifiers within the storage unit; and wherein the robotic control system operates to select the requested product item with the command system through use of the identifier of the requested product, wherein the selection of the requested product causes a lookup of a stocking location of the requested product item within the storage unit and a communication of the stocking location to the robotics unit to retrieve the requested product item from the storage unit, the stocking location of the requested product item chosen from among respective stocking locations associated with the identifier of the requested product.

2. The robotic inventory dispensing system of claim 1, further comprising:

the computing device, the computing device including a user interface, wherein the computing device receives the selection of the requested product from a human user with the user interface, and wherein the computing device is in communication with the robotic control system to provide the identifier of the requested product to the command system, to cause the robotics unit to retrieve and deliver the requested product item corresponding to the requested product.

3. The robotic inventory dispensing system of claim 2, further comprising:

an electronic payment processing system, the electronic payment processing system arranged to communicate with the computing device, wherein the electronic payment processing system is configured to perform an electronic transaction to facilitate payment for the requested product, and wherein operations that provide the identifier of the requested product to the command system occur in response to success of the electronic transaction for payment for the requested product with the electronic payment processing system.

4. The robotic inventory dispensing system of claim 2, further comprising:

a plurality of additional computing devices, each including a respective user interface, wherein each of the additional computing devices is in communication with the robotic control system to provide respective identifiers of additional requested products to the command system, to cause the robotics unit to retrieve and deliver additional product items corresponding to the additional requested products.

5. The robotic inventory dispensing system of claim 4, further comprising:

a plurality of additional dispensing locations, wherein each dispensing location is dedicated to a customer session at a respective computing device;

wherein the robotics unit is configured to retrieve and deliver the additional product items corresponding to the additional requested products to the respective dispensing location dedicated to the customer session at the respective computing device.

6. The robotic inventory dispensing system of claim 1, further comprising:

a replenishing unit to add additional product items for the plurality of products, the replenishing unit accessible by the robotics unit, wherein the replenishing unit allows loading of the additional product items for stocking by the robotics unit into the storage unit.

7. The robotic inventory dispensing system of claim 6, further comprising a transparent barrier, wherein the transparent barrier is located on a first side of the inventory storage area, and wherein the replenishing unit is located on a second side of the inventory storage area.

8. The robotic inventory dispensing system of claim 6, wherein the robotic unit operates to scan and identify a new product item of the additional product items and record a location in the storage unit of the new product item in the tracking system, to enable later retrieval of the new product item at the location in the storage unit.

9. The robotic inventory dispensing system of claim 1, wherein the storage unit is further adapted to store the respective product items among the plurality of storage locations along a depth of the inventory storage area.

10. A robotic inventory dispensing system, comprising:

a storage unit defining a wall in a retail area, the storage unit adapted to store a plurality of products among a plurality of storage locations along a height and a width of the wall, and the storage unit stockable to store respective product items for the plurality of products;

a dispensing location located in the retail area, the dispensing location adapted to receive and dispense the respective product items for the plurality of products;

a barrier established in the retail area between the storage unit and the dispensing location, the barrier arranged in the retail area to restrict access to the storage unit;

a robotics unit operable to stock the respective product items within the storage unit, and the robotics unit further operable to retrieve a requested product item from the storage unit and deliver the requested product item through the barrier to the dispensing location, the requested product item associated with an identifier of a requested product of the plurality of products; and a kiosk including a computing device, the computing device operable to enable selection of the requested product by a human user with a user interface, wherein the computing device is configured to provide a command to initiate selection and delivery of the requested product item to the dispensing location; and a robotic control system to control the robotics unit, the robotic control system in communication with the computing device, and the robotic control system including:

a tracking system, wherein the tracking system is operable to track locations of the plurality of products, wherein the plurality of products are respectively associated with a plurality of product identifiers, and wherein the tracking system is further operable to track respective stocking locations of the respective product items within the storage unit for the plurality of products based on the plurality of product identifiers; and a command system, wherein the command system is operable to receive the command to initiate selection and delivery of the requested product item in response to selection of the requested product at the computing device, and wherein the command system is further operable to command the robotics unit to retrieve and deliver the requested product item from the storage unit to the dispensing location;

wherein the robotic control system operates to stock the storage unit independently of a planogram, wherein the plurality of products are automatically stocked by the robotics unit throughout the plurality of storage locations in the storage unit to mix stocking locations of different products associated with different product identifiers, and wherein the tracking system is further configured to track the mixed stocking locations of the different products associated with the different product identifiers within the storage unit; and wherein the robotic control system operates to select the requested product item with the command system through use of the identifier of the requested product, wherein the selection of the requested product item causes a lookup of a stocking location of the requested product item within the storage unit and a communication of the stocking location to the robotics unit to select the requested product item from the storage unit, the stocking location of the requested product item chosen from among respective stocking locations associated with the identifier of the requested product.

11. The robotic inventory dispensing system of claim 10, further comprising:

an electronic payment processing system, the electronic payment processing system arranged to communicate with the computing device, wherein the electronic payment processing system is configured to perform an electronic transaction to facilitate payment of the requested product, and wherein operations that provide the command to initiate selection and delivery of the requested product item occur in response to success of the electronic transaction for payment of the requested product with the electronic payment processing system.

12. The robotic inventory dispensing system of claim 10, further comprising:

a plurality of additional kiosks, each of the plurality of additional kiosks including a respective computing device that provides a respective user interface, wherein each computing device is configured to provide respective commands to initiate selection and delivery of additional requested products to the command system, to cause the robotics unit to retrieve and deliver additional product items corresponding to the additional requested products.

13. The robotic inventory dispensing system of claim 12, further comprising:

a plurality of additional dispensing locations, wherein each dispensing location is dedicated to a customer session at the respective computing device;

wherein the robotics unit is configured to retrieve and deliver the additional product items corresponding to the additional requested products to the respective dispensing location dedicated to the customer session at the respective computing device.

14. The robotic inventory dispensing system of claim 10, further comprising:

a replenishing unit that is not accessible due to the barrier, the replenishing unit to add additional product items for the plurality of products, wherein the replenishing unit is accessible by the robotic unit, and wherein the replenishing unit allows loading of the additional product items for stocking by the robotics unit into the storage unit.

15. The robotic inventory dispensing system of claim 14, wherein the robotic unit operates to scan and identify a new product item of the additional product items and record a location in the storage unit in the tracking system, to enable later retrieval of the new product item at the location in the storage unit.

16. The robotic inventory dispensing system of claim 10, wherein the barrier is a transparent barrier, wherein the transparent barrier is located on a first side of the wall facing a customer area within the retail area.

17. The robotic inventory dispensing system of claim 10, wherein the storage unit is further adapted to store the respective product items among the plurality of storage locations along a depth of the wall.

18. A method, performed by programmed electronics of a robotic inventory dispensing system, the robotic inventory dispensing system including a storage unit, a dispensing location, a robotics unit, a robotic control system, and an inventory tracking system, the method comprising:

defining an inventory of a plurality of products among a plurality of storage locations in a first and a second direction of the storage unit, the first direction being opposite of the second direction, wherein the storage unit is adapted to store respective items for the plurality of products;

stocking the inventory of the plurality of products within the storage unit using the robotics unit, the robotics unit operable to select a requested product item from the storage unit and deliver the requested product item from the storage unit to the dispensing location, wherein the requested product item is associated with a identifier of a requested product stocked in the inventory;

tracking locations of the inventory of the plurality of products within the storage unit using the inventory tracking system, wherein the plurality of products are respectively associated with a plurality of product identifiers, wherein the inventory tracking system further tracks respective stocking locations within the storage unit of the respective product items for each of the plurality of products based on the plurality of product identifiers;

receiving the identifier of the requested product stocked in the inventory, in response to selection of the requested product in a user interface of a computing device; and controlling the robotics unit to retrieve and deliver the requested product item to the dispensing location, in response to the receiving the identifier of the requested product;

wherein the robotic control system operates to stock the storage unit independently of a planogram, wherein the plurality of products are automatically stocked by the robotics unit throughout the storage unit to mix stocking locations of different products associated with different product identifiers, and wherein the inventory tracking system is further configured to track the mixed stocking locations of the different products associated with the different product identifiers within the storage unit; and wherein the robotic control system operates to select the requested product item through use of the identifier of the requested product, wherein the selection of the requested product item causes a lookup of a stocking location of the requested product item within the storage unit and a communication of the stocking location to the robotics unit to select the requested product item from the storage unit, the stocking location chosen from among respective stocking locations associated with the identifier of the requested product.

19. The method of claim 18, wherein the user interface of the computing device enables selection by a human user of the requested product from among the plurality of products, and wherein the computing device is in communication with the robotic control system to provide the identifier of the requested product, causing the robotics unit to retrieve and deliver the requested product item corresponding to the requested product.

20. The method of claim 18, wherein the robotic unit operates to scan and identify a new product item to be added to the inventory, and record a location in the storage unit in the inventory tracking system, to enable later retrieval of the new product item at the location in the storage unit.

21. The method of claim 18, further comprising:
    performing an electronic transaction to facilitate payment for the requested product, and providing the identifier of the requested product in response to success of the electronic transaction for payment of the requested product with an electronic payment processing system.

\* \* \* \* \*